(12) United States Patent
Wang et al.

(10) Patent No.: US 8,233,711 B2
(45) Date of Patent: Jul. 31, 2012

(54) LOCALITY-CONSTRAINED LINEAR CODING SYSTEMS AND METHODS FOR IMAGE CLASSIFICATION

(75) Inventors: Jinjun Wang, San Jose, CA (US); Fengjun Lv, San Jose, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 250 days.

(21) Appl. No.: 12/822,424

(22) Filed: Jun. 24, 2010

(65) Prior Publication Data
US 2011/0116711 A1    May 19, 2011

Related U.S. Application Data

(60) Provisional application No. 61/262,269, filed on Nov. 18, 2009.

(51) Int. Cl.
*G06K 9/00* (2006.01)
(52) U.S. Cl. .................................. 382/168; 382/224
(58) Field of Classification Search .................. 382/168, 382/170, 224–228, 305, 103, 232–253; 375/240.22
See application file for complete search history.

(56) References Cited

U.S. PATENT DOCUMENTS

| | | | |
|---|---|---|---|
| 6,404,923 B1* | 6/2002 | Chaddha | 382/224 |
| 8,055,081 B2* | 11/2011 | Luo et al. | 382/224 |
| 8,116,596 B2* | 2/2012 | McIntyre et al. | 382/305 |
| 2010/0054535 A1* | 3/2010 | Brown et al. | 382/103 |
| 2010/0124377 A1* | 5/2010 | Yu et al. | 382/224 |

OTHER PUBLICATIONS

Laazebnik et al., Beyond bags of features: Spatial Pyramid Matching g=for Recognizing Natural Scene Categories, date not available, pp. 1-8.*

* cited by examiner

*Primary Examiner* — Ishrat I Sherali
(74) *Attorney, Agent, or Firm* — Bao Tran; Joseph Kolodka

(57) ABSTRACT

Systems and methods are disclosed for classifying an input image by detecting one or more feature points on the input image; extracting one or more descriptors from each feature point; applying a codebook to quantize each descriptor and generate code from each descriptor; applying spatial pyramid matching to generate histograms; and concatenating histograms from all sub-regions to generate a final representation of the image for classification.

20 Claims, 5 Drawing Sheets

Approximated LLC Coding process 300

Step 3:
$c_i$ is an Mx1 vector with K non-zero elements whose values are the corresponding $c^*$ of step 2 input: $x_i$ ● ⟶ ● code: $c_i$

Step 2:
Reconstruct $x_i$ using $B_i$ $$c^* = \underset{c}{\operatorname{argmin}} \| x_i - c_i^T B_i \|^2$$
$$\text{st.} \sum_{j}^{K} c_j = 1$$

input: $x_i$ codebook: $B = \{b_j\}_{j=1,...,M}$

Step 1:
Find K-Nearest Neighbors of $x_i$, denoted as $B_i$

LOCALITY-CONSTRAINED LINEAR CODING SYSTEMS AND METHODS FOR IMAGE CLASSIFICATION

This application claims priority to U.S. Provisional Application Ser. No. 61/262,269 filed Nov. 18, 2009, the content of which is incorporated by reference.

BACKGROUND

The present application relates to image classification.

Recent state-of-the-art image classification systems consist of two major parts: bag-of-features (BoF) and spatial pyramid matching (SPM). The BoF method represents an image as a histogram of its local features. It is especially robust against spatial translations of features, and demonstrates decent performance in whole-image categorization tasks. However, the BoF method disregards the information about the spatial layout of features, hence it is incapable of capturing shapes or locating an object. Of the many extensions of the BoF method, including the generative part models, geometric correspondence search and discriminative codebook learning, the most successful results were reported by using SPM. The SPM method partitions the image into increasingly finer spatial sub-regions and computes histograms of local features from each sub-region. Typically, sub-regions, are used. Other partitions such as has also been attempted to incorporate domain knowledge for images with "sky" on top and/or "ground" on bottom. The resulting "spatial pyramid" is a computationally efficient extension of the orderless BoF representation, and has shown very promising performance on many image classification tasks.

A typical flowchart of the SPM approach based on BoF is illustrated on the left of FIG. 1. First, feature points are detected or densely located on the input image, and descriptors such as "SIFT" or "color moment" are extracted from each feature point (highlighted in blue circle in FIG. 1). This obtains the "Descriptor" layer. Then, a codebook with entries is applied to quantize each descriptor and generate the "Code" layer, where each descriptor is converted into an code (highlighted in green circle). If hard vector quantization (VQ) is used, each code has only one non-zero element, while for soft-VQ, a small group of elements can be non-zero. Next in the "SPM" layer, multiple codes from inside each sub-region are pooled together by averaging and normalizing into a histogram. Finally, the histograms from all sub-regions are concatenated together to generate the final representation of the image for classification.

Although the traditional SPM approach works well for image classification, people empirically found that, to achieve good performance, traditional SPM has to use classifiers with nonlinear Mercer kernels, e.g., Chi-square kernel. Accordingly, the nonlinear classifier has to afford additional computational complexity, implying a poor scalability of the SPM approach for real applications.

To improve the scalability, researchers aim at obtaining nonlinear feature representations that work better with linear classifiers. In a method called the ScSPM method, sparse coding (SC) is used instead of VQ to obtain nonlinear codes. In ScSPM, the restrictive cardinality constraint of VQ is relaxed, and a small number of basis from the codebook can be selected to jointly reconstruct the input descriptor. The final representation achieved superior image classification performance using only linear SVM classifiers. Although the ScSPM method saves the computation of calculating Chi-square kernel in non-linear classifier, it, however, migrates the cost from classifier to feature extractor, because the SC process is very computational demanding. This is due to the fact that the objective function in SC is not differentiable at 0. Most existing SC solvers, such as Matching Pursuit (MP) or Orthogonal MP, CoordinateDescent, LARS, among others, operate iteratively.

SUMMARY

In one aspect, systems and methods are disclosed for classifying an input image by detecting one or more feature points on the input image; extracting one or more descriptors from each feature point; applying a codebook to quantize each descriptor and generate code from each descriptor; applying spatial pyramid matching to generate histograms; and concatenating histograms from all sub-regions to generate a final representation of the image for classification.

Implementations of the system may include one or more of the following. The final representation of the image for classification can be a feature vector. The descriptor can be a SIFT descriptor or a color moment descriptor. Each code has only one non-zero element if hard vector quantization (VQ) is used. A small group of elements can be non-zero for soft VQ. Multiple codes from inside each sub-region can be pooled together by averaging and normalizing into a histogram. A fast approximated LLC can be applied first performing a K-nearest-neighbor search and then solving a constrained least square fitting problem. The LLC utilizes locality constraints to project each descriptor into a local-coordinate system, and the projected coordinates are integrated by max pooling to generate a final representation. The system can reconstruct input $x_i$ with codebook $B_i$ $$c^* = \operatorname*{argmin}_{c} \|x_i - c_i^T B\|^2 + \|d_i \cdot c_i\|^2$$

$$\text{st.} \sum_{j}^{M} c_j = 1$$

The method includes finding K-Nearest Neighbors of $x_i$, denoted as $B_i$; reconstructing $x_i$ using $B_i$ as $c^* = \operatorname{argmin}\|x_i - c_i^T B_i\|^2$; and generating $c_i$ as an M×1 vector with K non-zero elements whose values are the corresponding $c^*$.

Advantages of the preferred embodiments may include one or more of the following. The LLC is a fast implementation that utilizes the locality constraint to project each descriptor into its local-coordinate system. The LLC coding scheme replaces the VQ coding in traditional SPM and utilizes the locality constraints to project each descriptor into its local-coordinate system, and the projected coordinates are integrated by max pooling to generate the final representation. With linear classifier, the proposed approach performs remarkably better than the traditional nonlinear SPM, achieving state-of-the-art performance on several benchmarks.

Experimental results show that, the final representation generated by using LLC code can achieve an impressive image classification accuracy even with a linear SVM classifier. In addition, the optimization problem used by LLC has an analytical solution, where the computational complexity is low for each descriptor.

In another embodiment, an approximated LLC method performs a K-nearest-neighbor (K-NN) search and then solves a constrained least square fitting problem. In tests using a codebook with 2048 entries, a 300×300 image requires only 0.24 second on average for processing (including dense local descriptors extraction, LLC coding and SPM pooling to get the final representation). This efficiency significantly adds to the practical values of LLC for many real applications.

With linear classifier, the system performs remarkably better than the traditional nonlinear SPM, achieving state-of-theart performance on several benchmarks. Compared with the sparse coding strategy, the objective function used by LLC has an analytical solution. A fast approximated LLC method by first performing a K-nearest-neighbor search and then solving a constrained least square fitting problem, bearing low computational complexity. Hence even with very large codebooks, the system can still process multiple frames per second. This efficiency significantly adds to the practical values of LLC for real applications.

DESCRIPTION

Figure 1:
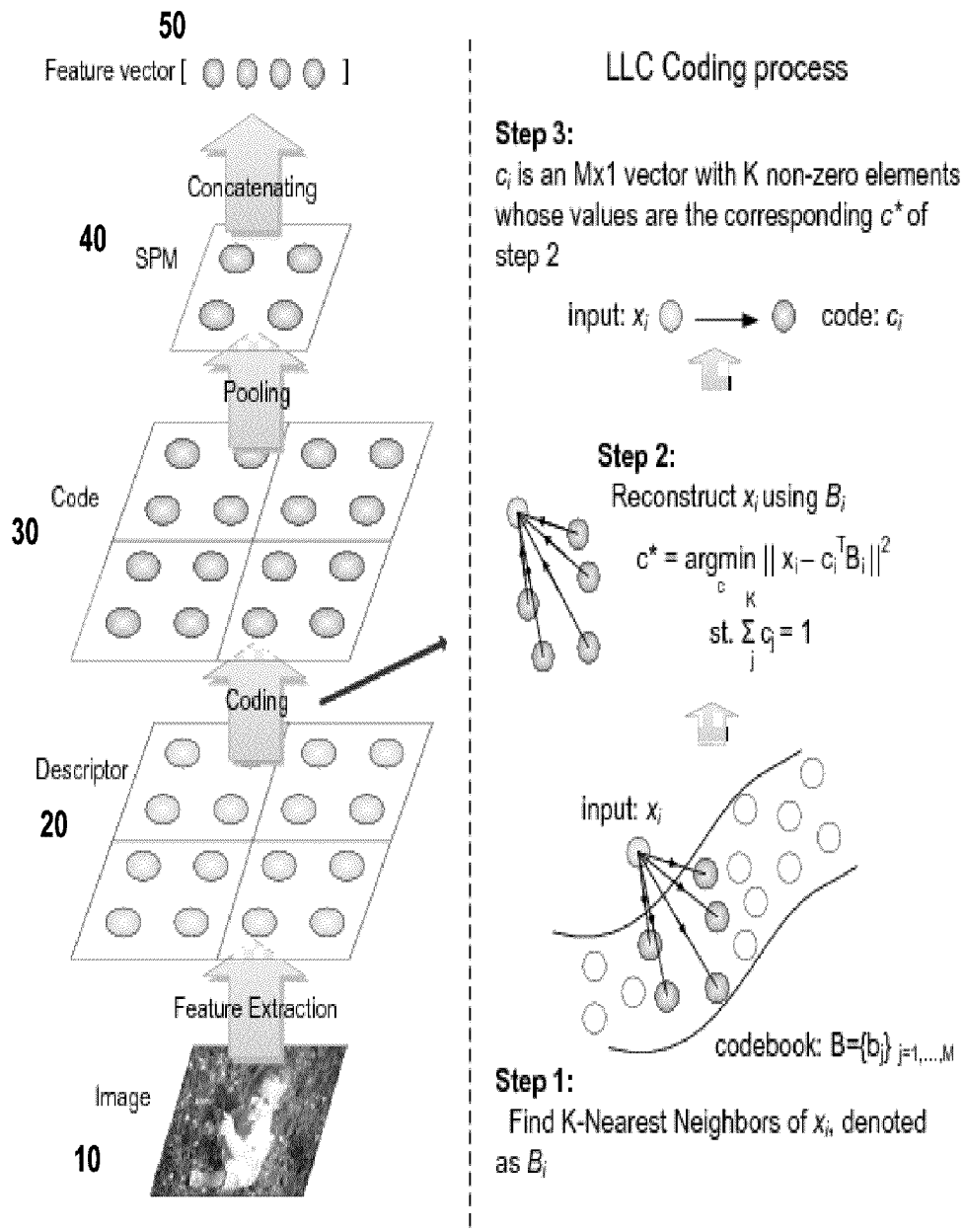
FIG. 1 shows a first exemplary LLC coding system.

FIG. 1 shows a first exemplary Locality Constrained Local Coordinate Coding (LCC) coding system. In LCC, the coding is encouraged to be local, and under certain assumptions locality is more essential than sparsity, for successful nonlinear function learning using the obtained codes. The system receives an image 10 and feature extraction is performed. One or more descriptors in layer 10 are generated, and coding of the descriptors are done to derive a code layer 30. The codes are pooled and spatial pyramid matching (SPM) layer 40 can be applied. After suitable concatenation, a feature vector 50 can be generated.

In the embodiment of FIG. 1, feature points are detected or densely located on the input image 10, and descriptors such as "SIFT" or "color moment" are extracted from each feature point. This obtains the "Descriptor" layer 20. Then, a codebook with entries is applied to quantize each descriptor and generate the "Code" layer 30, where each descriptor is converted into code. If hard vector quantization (VQ) is used, each code has only one non-zero element, while for soft-VQ, a small group of elements can be non-zero. Next in the "SPM" layer 40, multiple codes from inside each sub-region are pooled together by averaging and normalizing into a histogram. Finally, the histograms from all sub-regions are concatenated together to generate the final representation of the image for classification as the feature vector 50.

In the coding operation of FIG. 1, the process determines the K-nearest neighbors of x in step 1. Next, it reconstructs X using B in step 2, as described in more details below. In step 3, the process determines c, which is an M×1 vector whose values are the corresponding c of step 2. In one embodiment of the locality-constrained Linear Coding (LLC) instead of VQ in the original BoF approach. As illustrated in the "LLC coding process" block in FIG. 1, the LLC code for each descriptor is calculated by:

$$\min_c \sum_{i=1}^{N} \|x_i - c_i B\|^2 + \lambda \|d_i \cdot c_i\|^2$$

$$\text{st.} \sum_j c_i(j) = 1, \forall i$$

where $d_i \in R^M$ is the locality adaptor that gives different freedom for each basis vector proportional to its similarity to the input descriptor $x_i$. Specifically, $$d_i = \exp^{-1}(-\text{dist}(x_i, B)/\sigma)$$

where $\text{dist}(x_i, B) = [\text{dist}(x_i, b_1), \ldots, \text{dist}(x_i, b_M)]$, and $\text{dist}(x_i, b_j)$ is the Euclidean distance between $x_i$ and $b_j$. Typically the system subtracts $\max(\text{dist}(x_i, B))$ from $\text{dist}(x_i, B)$ such that $d_i$ ranges between [0,1).

Figure 2:
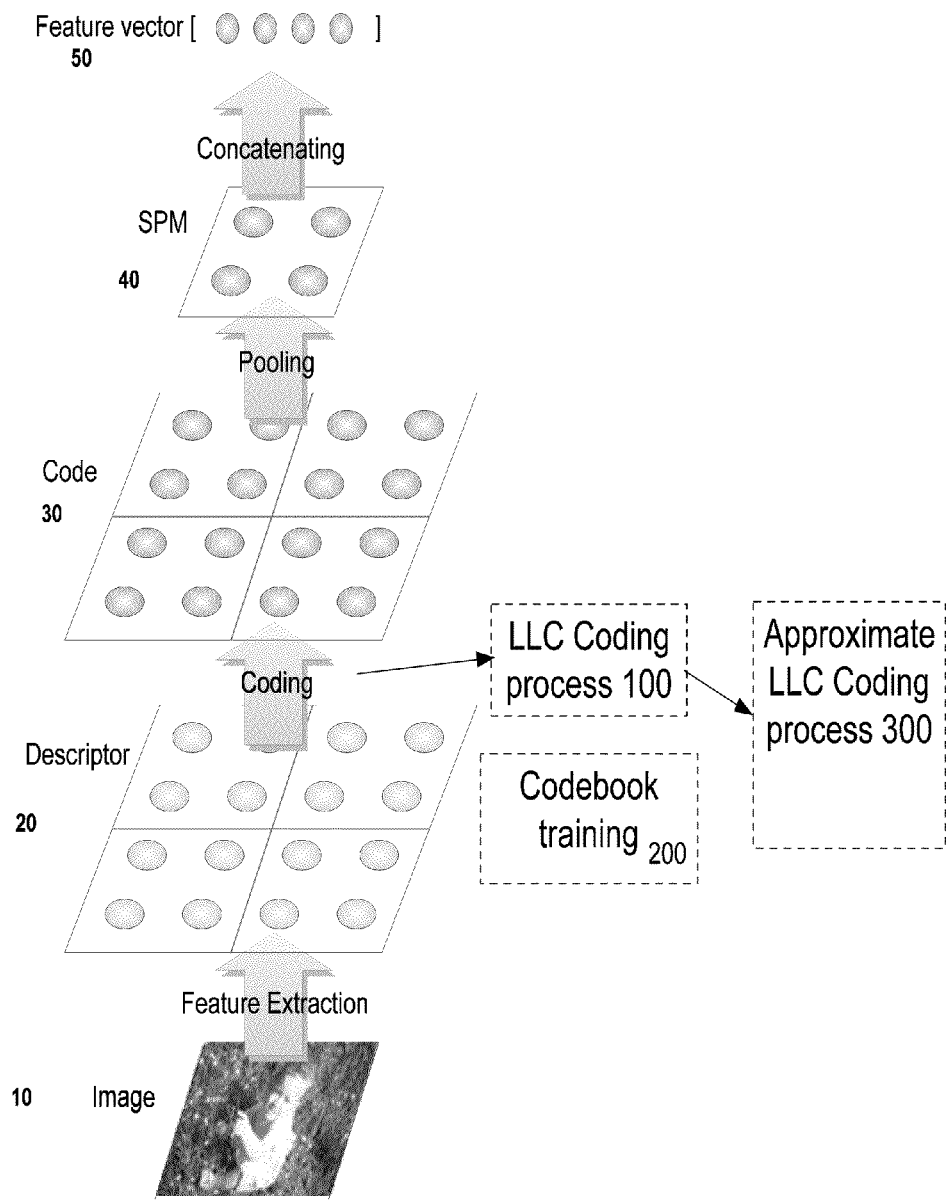
FIG. 2 shows a second exemplary LLC coding system.

FIG. 2 shows a second exemplary LLC coding system. Similar to the system of FIG. 1, the system of FIG. 2 receives an image 10 and feature extraction is performed. One or more descriptors in layer 10 are generated, and coding of the descriptors are done to derive a code layer 30. An LLC coding process 100 is applied, and a codebook training process 200 can be run. LLC utilizes the locality constraint to project each descriptor into its local-coordinate system. The LLC criteria enables LLC to take both the advantages of using relaxed cardinality constraint from VQ and jointly reconstructing the local descriptor like in ScSPM. Experimental results show that, the final representation generated by using LLC code can achieve very impressive image classification accuracy even with linear SVM classifier.

Alternatively, an approximated LLC coding process 300 can be done. The approximated LLC method performs a K-nearest-neighbor (K-NN) search and then solves a constrained least square fitting problem. As observed from experiments, using a codebook with 2048 entries, extracting dense local descriptors, converting to LLC codes and finally SPM pooling to get the final representation from 300×300 image input requires only 0.24 second in average. This significantly adds to the practical values of LLC for many applications.

The codes are pooled and spatial pyramid matching (SPM) layer 40 can be applied. After suitable concatenation, a feature vector 50 can be generated.

Figure 3:
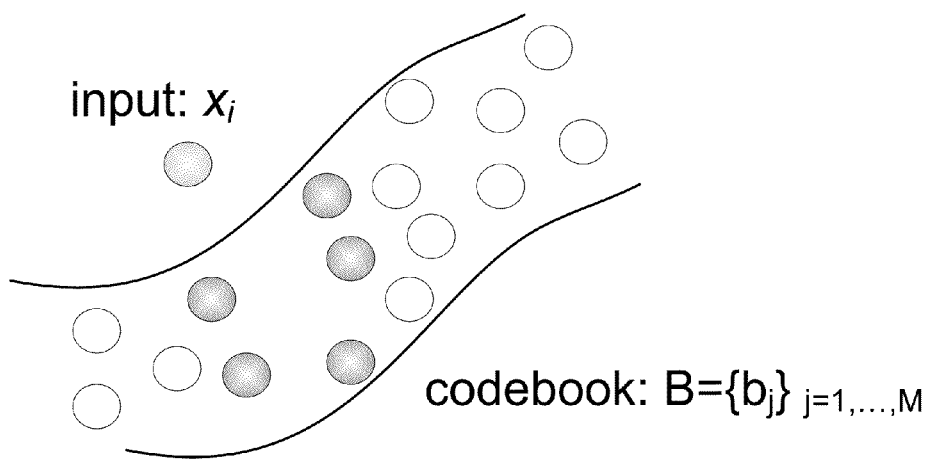
FIG. 3 shows in more detail the LLC coding process.

FIG. 3 shows in more detail the LLC coding process 100. In the process, from input $x_i$ and a codebook $B_i$, the process reconstruct $x_i$ using $B_i$ $$c^* = \arg\min_c \|x_i - c_i^T B\|^2 + \|d_i \cdot c_i\|^2$$

$$\text{st.} \sum_j^M c_j = 1$$

Figure 4:
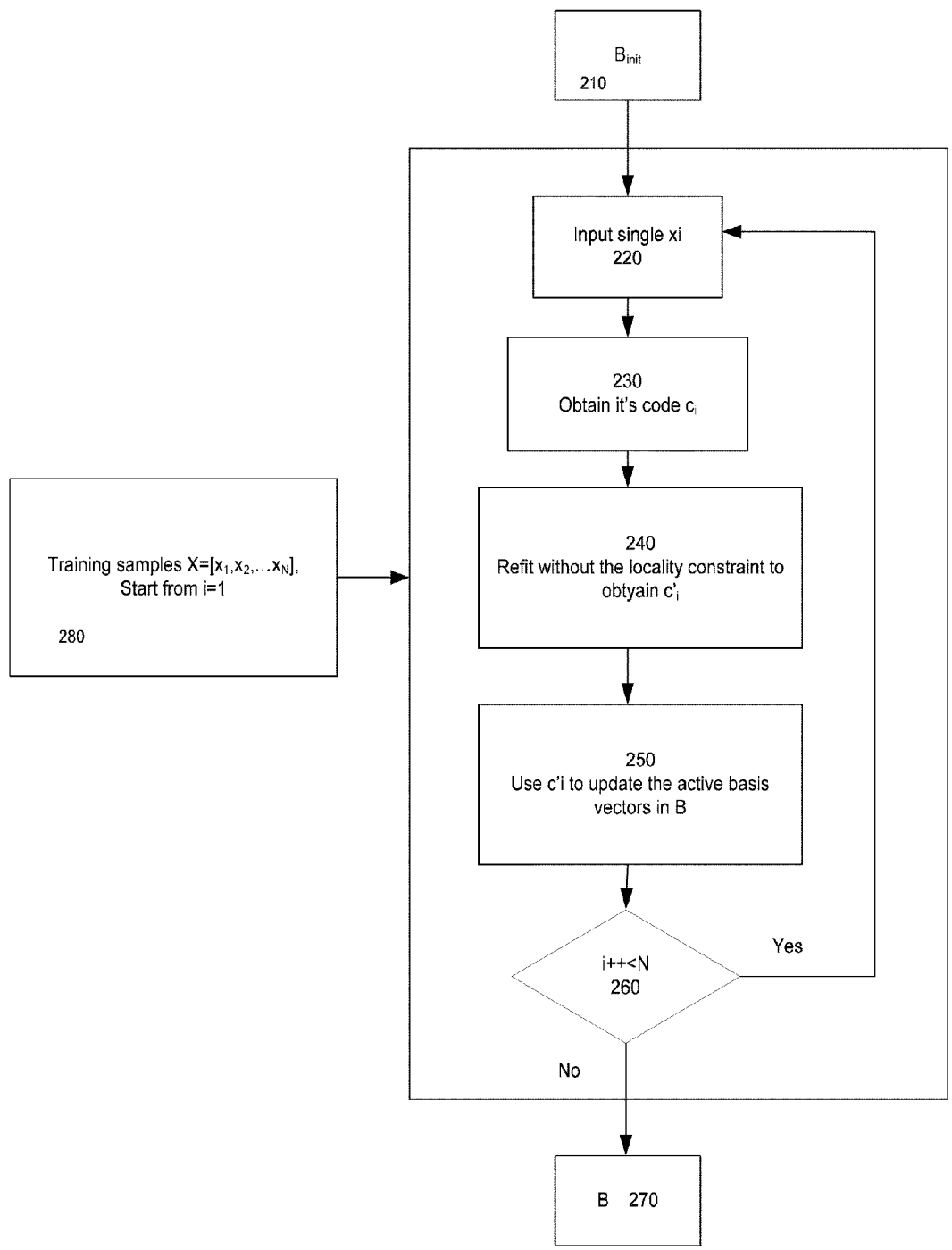
FIG. 4 shows in more details an exemplary code book training process.

FIG. 4 shows in more details an exemplary code book training process. The process is an incremental method to build the code book for LLC. As illustrated in FIG. 4, in 210, a codebook trained by K-Mean clustering is used to initialize B. The process gets X training samples and start with the first one in 280. The process loops through all the training descriptors to update B incrementally. In each iteration, the process takes in single examples $x_i$ in 220 and obtains the corresponding LLC codes using current B in 230. Then, the process keeps the set of basis $B_i$ whose corresponding weights are larger than a predefined constant, and refits $x_i$ without the locality constraint in 240. The obtained code is then used to update the basis in a gradient descent fashion in 270. The process can project those basis outside the unit circle onto the unit circle.

Figure 5:
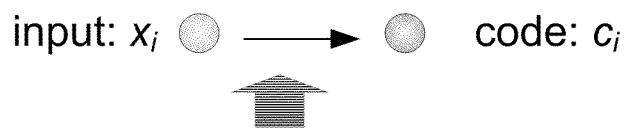
FIG. 5 shows an approximated LLC coding process.
Figure 5:
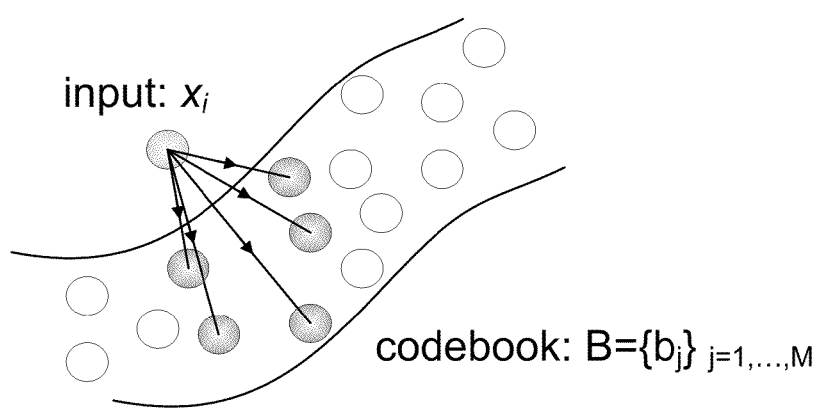

FIG. 5 shows an approximated LLC coding process. In one embodiment, the approximated LLC method performs a K-nearest-neighbor (K-NN) search and then solves a constrained least square fitting problem. In tests using a codebook with 2048 entries, a 300×300 image requires only 0.24 second on average for processing (including dense local descriptors extraction, LLC coding and SPM pooling to get the final representation). This efficiency significantly adds to the practical values of LLC for many real applications.

With linear classifier, the system performs remarkably better than the traditional nonlinear SPM, achieving state-of-the-art performance on several benchmarks. Compared with the sparse coding strategy, the objective function used by LLC has an analytical solution. A fast approximated LLC method by first performing a K-nearest-neighbor search and then solving a constrained least square fitting problem, bearing low computational complexity. Hence even with very large codebooks, the system can still process multiple frames per second. This efficiency significantly adds to the practical values of LLC for real applications.

Next, more details on locality-constrained linear coding are discussed. In the following, X is a set of D-dimensional local descriptors extracted from an image, $X=[x_1, x_2, \ldots, x_N] \in R^{D \times N}$. Given a codebook with M entries, $B=[b_1, b_2, \ldots, b_M] \in R^{D \times M}$, different coding schemes convert each descriptor into a M-dimensional code to generate the final image representation.

Traditional SPM uses VQ coding which solves the following constrained least square fitting problem:

$$\underset{c}{\operatorname{argmin}} \sum_{i=1}^{N} \|x_i - Bc_i\|^2 \quad (1)$$
$$\text{s.t. } Pc_iP_{l^0} = 1, Pc_iP_{l^1} = 1, c_i \pm 0, \forall i$$

where $C=[c_1, c_2, \ldots, c_N]$ is the set of codes for X. The cardinality constraint $Pc_iP_{l^0}=1$ means that there will be only one non-zero element in each code $c_i$, corresponding to the quantization id of $x_i$. The non-negative, $l^1$ constraint $Pc_iP_{l^1}=1$, $c_i \geq 0$ means that the coding weight for x is 1. In practice, the single non-zero element is found by searching the nearest neighbor.

To ameliorate the quantization loss of VQ, the restrictive cardinality constraint $Pc_iP_{l^0}=1$ in Eq. (1) can be relaxed by using a sparsity regularization term. In ScSPM [22], such a sparsity regularization term is selected to be the $l^1$ norm of $c_i$, and coding each local descriptor $x_i$ thus becomes a standard sparse coding (SC) problem:

$$\underset{c}{\operatorname{argmin}} \sum_{i=1}^{N} Px_i - Bc_iP^2 + \lambda Pc_iP_{l^1} \quad (2)$$

The sparsity regularization term plays several important roles: First, the codebook B is usually over-complete, M>D, and hence $l^1$ regularization is necessary to ensure that the under-determined system has a unique solution; Second, the sparsity prior allows the learned representation to capture salient patterns of local descriptors; Third, the sparse coding can achieve much less quantization error than VQ. Accordingly, even with linear SVM classifier, ScSPM can outperform the nonlinear SPM approach by a large margin on benchmarks like Caltech-101.

In Locality-constrained Linear Coding (LLC), as suggested by LCC, locality is more essential than sparsity, as locality must lead to sparsity but not necessary vice versa. LLC incorporates locality constraint instead of the sparsity constraint in Eq. (2), which leads to several favorable properties as explained in Subsection 2.4. Specifically, the LLC code uses the following criteria:

$$\underset{c}{\min} \sum_{i=1}^{N} Px_i - Bc_iP^2 + \lambda \|d_i e c_i\|^2 \quad (3)$$
$$\text{s.t. } 1^T c_i = 1, \forall i$$

where e denotes the element-wise multiplication, and $d_i \in R^M$ is the locality adaptor that gives different freedom for each basis vector proportional to its similarity to the input descriptor $x_i$. Specifically, $$d_i = \exp\left(\frac{dist(x_i, B)}{\sigma}\right). \quad (4)$$

where $dist(x_i,B)=[dist(x_i,b_1), \ldots, dist(x_i,b_M)]^T$, and $dist(x_i,b_j)$ is the Euclidean distance between $x_i$ and $b_j$. $\sigma$ is used for adjusting the weight decay speed for the locality adaptor. Usually we further normalize $d_i$ to be between (0,1] by subtracting $\max(dist(x_i,B))$ from $dist(x_i,B)$. The constraint $1^T c_i=1$ follows the shift-invariant requirements of the LLC code. Note that the LLC code in Eqn. 3 is not sparse in the sense of $l^0$ norm, but is sparse in the sense that the solution only has few significant values. In practice, we simply threshold those small coefficients to be zero.

To achieve good classification performance, the coding scheme should generate similar codes for similar descriptors. Following this requirement, the locality regularization term $\|d_i e c_i\|^2$ in Eq. (3) presents several attractive properties:

1. Better reconstruction. In VQ, each descriptor is represented by a single basis in the codebook, as illustrated in FIG. 1.a. Due to the large quantization errors, the VQ code for similar descriptors might be very different. Besides, the VQ process ignores the relationships between different bases. Hence non-linear kernel projection is required to make up such information loss. On the other side, as shown in FIG. 1.c in LLC, each descriptor is more accurately represented by multiple bases, and LLC code captures the correlations between similar descriptors by sharing bases.

2. Local smooth sparsity. Similar to LLC, SC also achieves less reconstruction error by using multiple bases. Nevertheless, the regularization term of $l^1$ norm in SC is not smooth. As shown in FIG. 1.b, due to the over-completeness of the codebook, the SC process might select quite different bases for similar patches to favor sparsity, thus losing correlations between codes. On the other side, the explicit locality adaptor in LLC ensures that similar patches will have similar codes.

3. Analytical solution. Solving SC usually requires computationally demanding optimization procedures. For instance, the Feature Sign algorithm utilized by Yang [22] has a computation complexity of O(M×K) in the optimal case [16], where K denotes the number of non-zero elements. Unlike SC, the solution of LLC can be derived analytically by:

$$\tilde{c}_i = (C_i + \lambda \operatorname{diag}(d)) \backslash 1 \quad (5)$$

$$c_i = \tilde{c}_i / 1^T \tilde{c}_i, \quad (6)$$

where $C_i = (B - 1x_i^T)(B - 1x_i^T)^T$ denotes the data covariance matrix. As seen in Section 3, the LLC can be performed very fast in practice.

Next, an approximated LLC for Fast Encoding is discussed. The LLC solution only has a few significant values, or equivalently, solving Eq. (3) actually performs feature selection: it selects the local bases for each descriptor to form a local coordinate system. This suggests that we can develop an even faster approximation of LLC to speedup the encoding process. Instead of solving Eq. (3), K(K<D<M) nearest neighbors of $x_i$ can be used as the local bases $B_i$, and a much smaller linear system is solved to get the codes:

$$\min_{\tilde{c}} \sum_{i=1}^{N} \|x_i - \tilde{c}_i B_i\|^2 \quad (7)$$

$$\text{st. } 1^T \tilde{c}_i = 1, \forall i.$$

This reduces the computation complexity from $O(M^2)$ to $O(M+K^2)$, where K=M. The final implementation of such approximated LLC process is illustrated in FIG. 1 right. Though this approximated encoding appears to be similar to Local Linear Embedding, the whole procedure of LLC itself differs from LLE clearly, because LLC incorporates an additional codebook learning step where the inference is derived from Eq. (3). The codebook learning step will be further explained in Section 4.

As K is usually very small, solving Eq. (7) is very fast. For searching K-nearest neighbors, an efficient hierarchical K-NN search strategy can be used, where each descriptor is first quantized into one of L subspaces, and then in each subspace an $R^{M \times D}$ codebook was applied. The effective size of the codebook becomes L×M. In this way, a much larger codebook can be used to improve the modeling capacity, while the computation in LLC remains almost the same as that in using a single $R^{M \times D}$ codebook.

Next, codebook optimization is discuseed. One way to generate the codebook is to use clustering based method such as K-Means. In another embodiment, the LLC coding criteria is used to train the codebook, which further improves the performance. Next, an effective on-line learning method for this purpose is discussed.

Revisiting Eq. (3), the process factorizes each training descriptor into the product of an LLC code and a codebook. Hence an optimal codebook B* can be obtained by $$\underset{C,B}{\operatorname{argmin}} \sum_{i=1}^{N} \|x_i - Bc_i\|^2 + \lambda \|d_i \odot c_i\|^2 \quad (8)$$

$$\text{st. } 1^T c_i = 1, \forall i. \quad (9)$$

$$\|b_j\|^2 \leq 1, \forall j$$

Eq. (8) can be solved using Coordinate Descent method to iteratively optimizing C(B) based on existing B(C). However, in practice, the number of training descriptors N is usually large (2,000,000+ in our experiment), such that holding all the LLC codes together in each iteration is too memory consuming. The on-line method reads a small batch of descriptors x at a time and incrementally updates the codebook B.

One embodiment uses a codebook trained by K-Means clustering to initialize B. Then the system loops through all training descriptors to update B incrementally. Each iteration takes in a single examples $x_i$ (or a small batch of them), and solves Eq. (3) to obtain the corresponding LLC codes using current B. Then, this is used as a feature selector. The system only keeps the set of basis $B_i$ whose corresponding weights are larger than a predefined constant, and refits $x_i$ without the locality constraint. The obtained code is then used to update the basis in a gradient descent fashion. Finally, those basis outside the unit circle are projected onto the unit circle. Pseudo code for the incremental codebook optimization process is:

```
input: B_init ∈ R^{M×D}, X ∈ R^{N×D}, λ, σ
output: B
 1:        B ← B_init.
 2:        for i = 1 to N do
 3:            d ← 1 × M zero vector,
               {locality constraint parameter}
 4:            for j = 1 to M do
 5:                d_j ← exp^{-1}(-(x_i - b_j)^2/σ).
 6:            end for
               {coding}
 7:            c_i ← argmax_c ||x_i - c^T B||^2 + λ||d,c||^2
                   s.t. Σ_j c(j) = 1.
               {remove bias}
 8:            id ← {j|c_i(j) > 0.01}, B_i ← B(id,:),
 9:            č_i ← argmax_c ||x_i - c^T B_i||^2
                   s.t. Σ_j c(j) = 1.
               {update basis}
10:            ΔB_i ← = -2č_i(x_i - č_i^T B_i), μ ← √1/i,
11:            B_i ← B_i - μΔB_i/|č_i|_2,
12:            B(id, :) ← proj(B_i).
13:        end for
```

The foregoing system presents an efficient image representation method called Locality-constrained Linear Coding (LLC). LLC is easy to compute and gives superior image classification performance than many existing approaches. LLC applies locality constraint to select similar basis of local image descriptors from a codebook, and learns a linear combination weight of these basis to reconstruct each descriptor. An approximation method can be used to further speed-up the LLC computation, and an optimization method can be used to incrementally learn the LLC codebook using large-scale training descriptors. Experimental results based on several well-known dataset validate the good performance of LLC.

The present inventors contemplate that additional codebook training methods, such as supervised training, can be used. Additionally, besides exact-nearest-neighbor search applied in the paper, approximated-nearest-neighbor search algorithms can be used to further improve the computational efficiency of approximated LLC. Moreover, integration of the LLC technique into practical image/video search/retrieval/indexing/management applications can improve the performance of those systems.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer to support the 3D CNN is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for classifying an input image, comprising:
    detecting one or more feature points on the input image;
    extracting one or more descriptors from each feature point;
    applying a codebook to quantize each descriptor and generate code from each descriptor;
    applying spatial pyramid matching to generate histograms; and
    concatenating histograms from all sub-regions to generate a final representation of the image for classification.

2. The method of claim 1, wherein the final representation of the image for classification comprises a feature vector.

3. The method of claim 1, wherein the descriptor comprises a SIFT descriptor or a color moment descriptor.

4. The method of claim 1, wherein each code has only one non-zero element if hard vector quantization (VQ) is used.

5. The method of claim 1, wherein a small group of elements can be non-zero for soft VQ.

6. The method of claim 1, wherein multiple codes from inside each sub-region are pooled together by averaging and normalizing into a histogram.

7. The method of claim 1, comprising performing a fast approximated LLC by first performing a K-nearest-neighbor search and then solving a constrained least square fitting problem.

8. The method of claim 1, wherein the LLC utilizes locality constraints to project each descriptor into a local-coordinate system, and the projected coordinates are integrated by max pooling to generate a final representation.

9. The method of claim 1, comprising reconstructing input $x_i$ with codebook $B_i$ where $$c^* = \underset{c}{\operatorname{argmin}} \|x_i - c_i^T B\|^2 + \|d_i \cdot c_i\|^2$$

$$\text{st.} \sum_j^M c_j = 1.$$

10. The method of claim 1, comprising:
    finding K-Nearest Neighbors of data $x_i$, denoted as $B_i$
    reconstructing $x_i$ using $B_i$
    determining $$c^* = \underset{c}{\operatorname{argmin}} \|x_i - c_i^T B_i\|^2$$

generating $c_i$ as an M×1 vector with K non-zero elements whose values are the corresponding $c^*$.

11. An image classifier, comprising:
    means for detecting one or more feature points on the input image;
    means for extracting one or more descriptors from each feature point
    means for applying a codebook to quantize each descriptor and generate code from each descriptor;
    means for applying spatial pyramid matching to generate histograms; and
    means for concatenating histograms from all sub-regions to generate a final representation of the image for classification.

12. The image classifier of claim 11, wherein the final representation of the image for classification comprises a feature vector.

13. The image classifier of claim 11, wherein the descriptor comprises a SIFT descriptor or a color moment descriptor.

14. The image classifier of claim 11, wherein each code has only one non-zero element if hard vector quantization (VQ) is used.

15. The image classifier of claim 11, wherein a small group of elements can be non-zero for soft VQ.

16. The image classifier of claim 11, wherein multiple codes from inside each sub-region are pooled together by averaging and normalizing into a histogram.

17. The image classifier of claim 11, comprising means for performing a fast approximated LLC by first performing a K-nearest-neighbor search and then solving a constrained least square fitting problem.

18. The image classifier of claim 11, wherein the LLC utilizes locality constraints to project each descriptor into a local-coordinate system, and the projected coordinates are integrated by max pooling to generate a final representation.

19. The image classifier of claim 11, comprising means for reconstructing input $x_i$ with codebook $B_i$ where $$c^* = \underset{c}{\operatorname{argmin}} \|x_i - c_i^T B\|^2 + \|d_i \cdot c_i\|^2$$

$$\text{st.} \sum_j^M c_j = 1.$$

20. The image classifier of claim 11, comprising:
    means for finding K-Nearest Neighbors of data $x_i$, denoted as $B_i$
    means for reconstructing $x_i$ using $B_i$
    where $$c^* = \underset{c}{\operatorname{argmin}} \|x_i - c_i^T B_i\|^2$$

means for generating $c_i$ as an M×1 vector with K non-zero elements whose values are the corresponding $c^*$.

* * * * *